United States Patent [19]

Ikeda et al.

[11] Patent Number: 5,027,040
[45] Date of Patent: Jun. 25, 1991

[54] EL OPERATING POWER SUPPLY CIRCUIT

[75] Inventors: Takaaki Ikeda, Ageo; Toshihiko Suga, Kawasaki; Akihiko Kuroiwa, Yokohama, all of Japan

[73] Assignees: Daichi Company, Ltd.; Nihon Beam Electronics Company, Ltd., both of Tokyo, Japan

[21] Appl. No.: 406,237

[22] Filed: Sep. 12, 1989

[30] Foreign Application Priority Data

| Sep. 14, 1988 [JP] | Japan | 63-231362 |
| Mar. 8, 1989 [JP] | Japan | 1-55534 |
| Mar. 17, 1989 [JP] | Japan | 1-30613[U] |
| Mar. 17, 1989 [JP] | Japan | 1-30614[U] |

[51] Int. Cl.⁵ .......................................... H05B 37/00
[52] U.S. Cl. .............................. 315/241 R; 315/246; 315/219; 315/169.3
[58] Field of Search ................... 315/169.3, 246, 244, 315/242, 241 R, 219; 340/781; 331/113 A

[56] References Cited

U.S. PATENT DOCUMENTS

| 3,749,977 | 7/1973 | Sliker | 340/781 |
| 4,253,097 | 2/1921 | Hochstrate | 340/781 |
| 4,254,362 | 3/1981 | Tulleners | 315/219 |
| 4,319,164 | 3/1982 | Tulleners | 315/169.3 |
| 4,346,332 | 8/1982 | Walden | 315/244 |
| 4,611,150 | 9/1986 | Ball | 315/169.3 |
| 4,633,141 | 12/1986 | Weber | 315/169.3 |
| 4,749,914 | 6/1988 | Feher | 315/246 |
| 4,845,489 | 7/1989 | Hormel | 315/169.3 |

FOREIGN PATENT DOCUMENTS

| 0278253 | 8/1988 | European Pat. Off. |
| 2120927 | 8/1972 | France |
| 2045552 | 10/1980 | United Kingdom |
| 2046012 | 11/1980 | United Kingdom |

OTHER PUBLICATIONS

Electronic Letters, vol. 24, No. 7, Mar. 31, 1988, Stevenage, Herts, GB, pp. 439-440; D. C. Hamill: "Phase-Locked Induction Heating Inverter Employing Power MOSFETs", *FIG. 1*.

Primary Examiner—Eugene R. LaRoche
Assistant Examiner—A. Zarabian
Attorney, Agent, or Firm—Oblon, Spivak, McClelland, Maier & Neustadt

[57] ABSTRACT

In a power supply circuit for operating an electroluminescent (EL) element comprising a DC power supply, an inverter connected across the power supply, and the EL element connected to the inverter, an inductor is inserted between the inverter and the EL element wherein an AC voltage is applied from the inverter through the inductor to the EL element to emit light. Another EL operating circuit includes a DC power supply, an inverter, a transformer, and a bipolar capacitor connected in this order and an AC power output on a secondary winding of the transformer is applied to an EL element to generate light. Both the circuits enables a noticeable luminance increase and power saving.

23 Claims, 18 Drawing Sheets

EL OPERATING POWER SUPPLY CIRCUIT

BACKGROUND OF THE INVENTION

This invention relates to an EL operating power supply circuit.

Electroluminescent (EL) elements or panels are widely used as EL displays and background light for liquid crystal displays.

The EL element is predominantly a capacitance load when considered as a load, and generally requires AC voltage application for operation. The luminance and corresponding surface illuminance of the EL element largely depends on both the voltage and frequency of alternating current applied thereto. In order that the EL element generate more light, the effective or root-mean-square value and/or the frequency of applied voltage is increased.

No particular measure is required when the EL element is operated directly with an ordinary AC power supply, for example, having an effective value of 100 volts and a frequency of 50 or 60 Hz. To derive more light from the EL element, however, it is necessary to increase the frequency and to increase the voltage within the withstand voltage of the EL element. When the EL element is operated directly with an ordinary 100-volt AC power supply, the maximum voltage applied to the EL element has a peak magnitude of 140 volts (a peak-to-peak magnitude of 280 volts). Most EL elements have a rated withstand voltage of approximately 210 volts (a peak-to-peak value of 420 volts). The permissible frequency has a practical upper limit of approximately 400 Hz in view of the lifetime of EL element.

The frequency of voltage applied to an EL element may be increased by once rectifying an AC power to form a DC power supply of about ±140 volts, and alternately opening the positive/negative power supply circuit at the desired frequency f by means of a push-pull circuit, thereby applying AC voltage at the frequency f to the EL element. Generally, power transistors and power MOSFET's are used as the switching elements of the push-pull circuit. An energy loss of such power transistors and power MOSFET's upon switching gives rise to problems that a relatively large heat sink is necessary, a considerable energy loss occurs and the site and manner of locating such transistors must be carefully taken into account.

Therefore, a primary object of the invention is to provide a power supply circuit for operating an EL element which essentially eliminates energy loss, recovers surplus electric charge in the EL element as reverse current flow to the power supply side, and thus increases energy efficiency.

SUMMARY OF THE INVENTION

According to a first aspect of the present invention, there is provided an EL operating power supply circuit comprising a DC power supply, an inverter connected across the power supply for producing an AC voltage at an output thereof, electroluminescent (EL) means connected to the output of the inverter, and an inductor inserted between the inverter and the electroluminescent means wherein the AC voltage is applied from the inverter through the inductor to the electroluminescent means to emit light.

According to a second aspect of the present invention, there is provided an EL operating power supply circuit comprising a DC power supply, an inverter connected across the power supply for changing the DC power into an AC power at an output thereof, and a transformer connected to the output of the inverter having primary and secondary windings, a bipolar capacitor connected to the transformer and electroluminescent (EL) means connected to the transformer such that an AC output power available on the transformer secondary winding is applied to the electroluminescent means to emit light.

Several preferred embodiments common to both the EL operating circuits of the first and second aspects are described below.

The electroluminescent means may be an electroluminescent element or an array of parallel connected electroluminescent elements.

A bipolar capacitor may be connected parallel to the electroluminescent means.

The inductance of the inductor or transformer reduces the current during switching operation of the inverter, and a charge accumulated in the electroluminescent means and/or the bipolar capacitor through the inverter and the inductor or transformer is recovered to the power supply side as a reverse current flow.

A buffering capacitor may be connected between the DC power supply and the inverter.

A second inverter may be connected between the DC power supply and the first inverter, the second inverter performing opposite switching operation to the first inverter.

A phase controlling coil may be connected between the DC power supply and the second inverter and/or between the first and second inverters.

The first inverter may be adapted to receive a switching signal wherein the frequency and/or pulse duration duty ratio of the switching signal can be set in a variable manner.

The inverter may include a charging inverter section and a feedback inverter section. The charging and feedback inverter sections may be driven by a switching signal having the same frequency and the same rise. The feedback inverter section has a larger pulse duration duty ratio than the charging inverter section.

The inverter may include at least a pair of switching elements, and first diodes each may be connected in parallel with one of the switching elements for forming a bypass channel for feeding back the reverse current flow. Second diodes each may be provided in forward series connection with one of the switching elements inside the inverter channel bypassed by the reverse current flow bypass channel.

BRIEF DESCRIPTION OF THE DRAWINGS

The above and other objects, features, and advantages of the present invention will be better understood from the following description taken in conjunction with the accompanying drawings, in which.

Like parts are designated by the same reference numerals throughout the figures.

DESCRIPTION OF THE PREFERRED EMBODIMENTS

Figure 1:
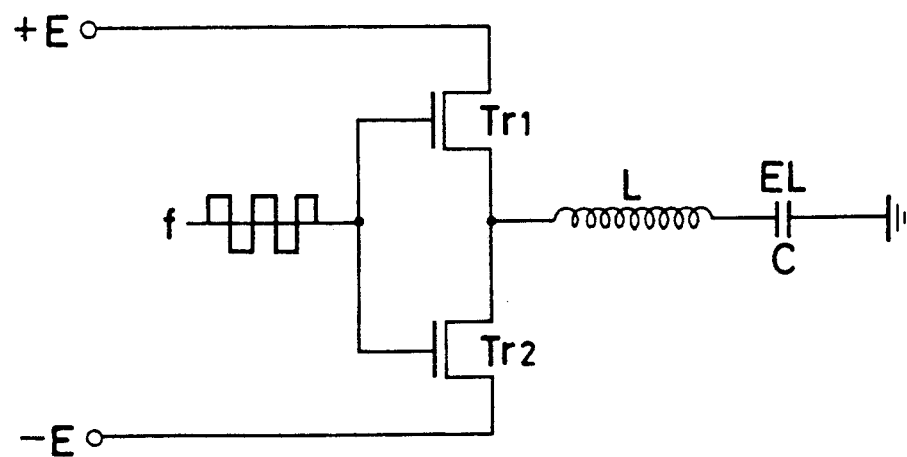
FIGS. 1, 6-10, 12, 15, 17-21 are diagrams illustrating EL operating power supply circuits according to different embodiments of the invention.

Referring to FIG. 1, there is illustrated an EL operating power supply circuit according to the first aspect of the present invention. It is to be noted that throughout the specification, a capacitor having a capacitance C is often referred to as capacitor C, and an inductor or coil having an inductance L referred to as inductor or coil L for brevity of description.

In the power supply circuit of the invention, an inverter including a pair of switching elements Tr1 and Tr2 is connected across a DC power supply having terminals at potentials $+E$ and $-E$. The inverter may be of any well-known construction and generally includes a pair of switching elements Tr1 and Tr2 which are alternately turned on and off at a switching frequency f. The switching elements Tr1 and Tr2 may be power transistors or power metal-oxide-semiconductor field-effect transistors (MOSFET) having a withstand voltage of at least 2E, constituting a push-pull inverter. In the illustrated embodiment, power MOSFET's are used as the switching elements Tr1 and Tr2 as well as Tr3 and Tr4 which will be described later. Alternatively, the switching elements Tr1 to Tr4 may be constructed from power transistors or ordinary transistors or MOSFET's.

When power MOSFET's are used, a pair of complementary P- and N-channel power MOSFET's are preferably selected for switching elements Tr1 and Tr2. Commercially available examples of the power MOSFET of the enhancement mode (or normally off mode) are "2SK310" and "2SJ117" manufactured by Hitachi, Ltd.

An electroluminescent (EL) element having a capacitance C and an inductor in the form of a coil having an inductance L are serially connected to the inverter in the form of paired switching elements Tr1 and Tr2, and either one of the EL element and the coil which is remote from the inverter is in turn grounded. The coil L is connected between the inverter and the EL element in the illustrated embodiment although the order of connection of the EL element and the coil L is not limited insofar as they are serially connected. Either the EL element or the coil may be on the side of the inverter. In an ideal state wherein the resistance (R) component or R equivalent component of the circuit is negligibly small, the relation between L and C is given by the equation:

$$f = \tfrac{1}{2}\pi\sqrt{LC}$$

wherein $\pi$ is the circular constant. Since the EL element has a known capacitance C and the frequency f is given by the desired luminance, L may be determined from the given values of f and C. Since f is generally in the range of 50 Hz to 600 Hz and C is of the order of 0.1 $\mu$F to 10 $\mu$F, then L is of the order of 30 mH to 10 H.

Figure 2:
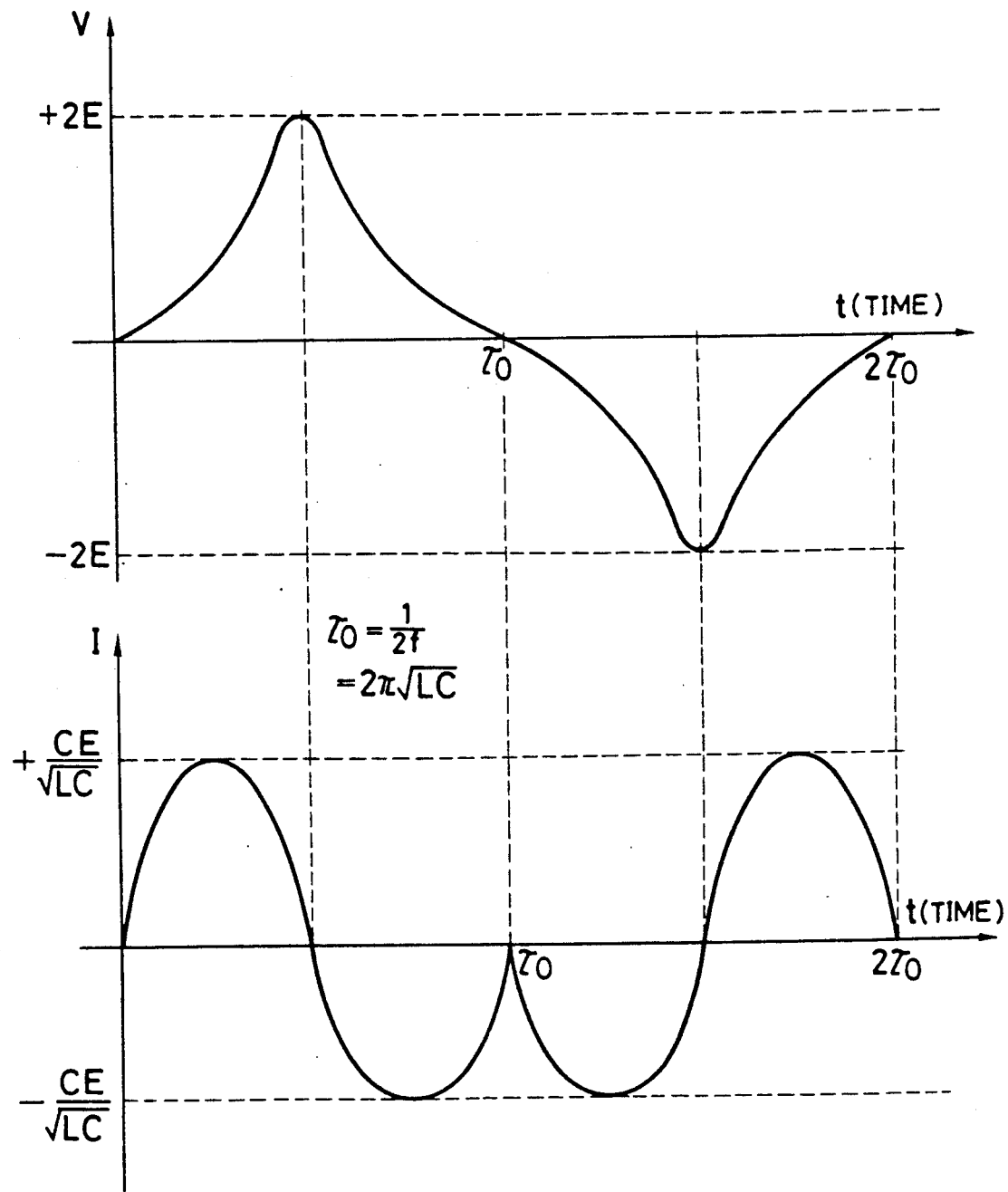
FIGS. 2, 3a and 3b are diagrams showing changes with time of voltage V and current I applied to an EL element, drain-source voltage $V_{DS}$ and current $I_{DS}$, and voltage $V_{EL}$ actually applied to the EL element, respectively.

With such a circuit arrangement, when a load is applied to the EL element, the EL element receives a voltage V and a current I as shown in FIG. 2 provided that the resistance (R) component of the circuit is negligibly small. The load voltage V varies over an amplitude of $\pm 2E$ for a period of $2\tau_0$ wherein $\tau_0 = \tfrac{1}{2}f = 2\pi\sqrt{LC}$. The load current I varies over an amplitude of $\pm CE/\sqrt{LC}$ for a period of $\tau_0$ with a phase shift due to the presence of the coil L. As a consequence, little current flows across the circuit at the instant of switching operation of switching elements Tr1 and Tr2. The energy loss is then very low though not zero due to the presence of an R component or the like. Thus no or little current flows across the inverter circuit for the rise or fall duration of switching operation of switching elements Tr1 and Tr2, resulting in a minimal switching energy loss.

As understood from the foregoing, the coil or inductor should have an inductance L which can meet the equation: $f = \tfrac{1}{2}\pi\sqrt{LC}$ and at the same time, is higher than the value given from the equation: $I_{max} = CE/\sqrt{LC}$ for the maximum permissible current for the coil. The coil should have a core having a high magnetic flux permeability at frequency f.

Figure 3A:
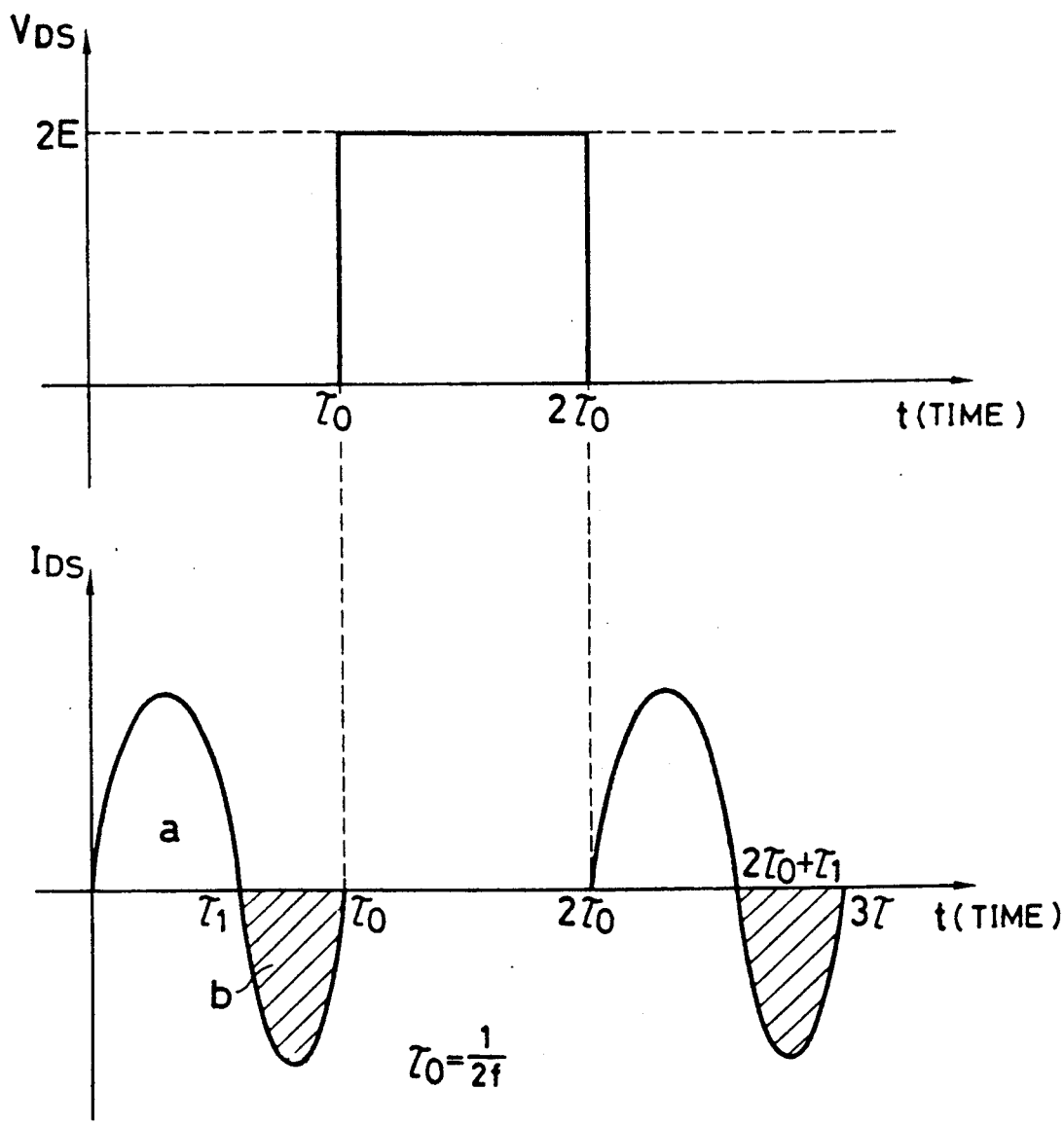

With the above-described arrangement, when a load is applied across the EL element, one of the switching elements in the switching section or inverter, for example, Tr1 produces a voltage $V_{DS}$ and a current $I_{DS}$ between the drain and the source as shown in FIG. 3a. Then the EL element receives a voltage $V_{EL}$ as shown in FIG. 3b.

More particularly, the voltage $V_{DS}$ that the first switching element Tr1 produces is a rectangular pulse voltage having a height of 2 E between $\tau_0$ and $2\tau_0$. The coil L acts to introduce a phase shift to current $I_{DS}$ such that in a time duration between 0 and $\tau_0$, electric charge flows as a forward current flow a to accumulate in the EL element for a time duration between 0 and $\tau_1$, and returns as a reverse current flow b for a time duration between $\tau_1$ and $\tau_0$. The reverse current flow b is shown as a shaded region of $I_{DS}$ in FIG. 3a and the corresponding power or charge is recovered to the same power supply terminal as a surplus power.

In the foregoing description, if it is assumed that the resistance (R) component is zero and that the energy required for the EL element to emit light is zero, then the regions a and b in FIG. 3a have an equal area, presenting perpetual motion. Of course, this cannot happen. In practice, the power is consumed by resistance equivalent components of the circuit, that is, a resistance component of the circuit, a magnetic field loss in the inductor (L), light emitting energy of the EL element and the like, resulting in a>b as illustrated in FIG. 3a. In fact, b is substantially smaller than a.

Figure 3B:
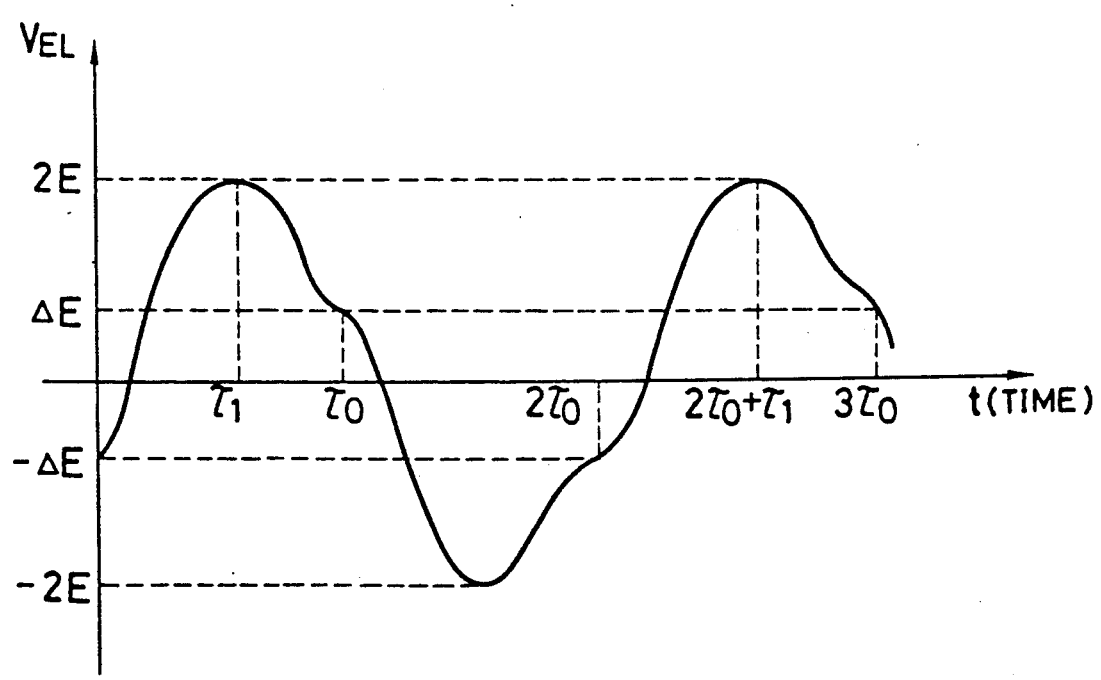

The voltage $V_{EL}$ across the EL element does not have a symmetric waveform as shown in FIG. 2, but a waveform vertically shifted by $\pm \Delta E$ as shown in FIG. 3b. This means that a charge of $\Delta E \cdot C$ cannot be fed back due to light emission of the EL element, dielectric loss and the like.

Nevertheless, important is the fact that a power corresponding to area b is recovered to the same power supply terminal, contributing to an improvement in power efficiency. In the prior art electroluminescent system, a power corresponding to this reverse flow component is discarded to the counter terminal, that is, the other power supply terminal as a transmission loss rather than a switching loss.

Figure 4:
FIG. 4 schematically illustrates an LCR series circuit.

The principle of power recovery is described in further detail by referring to an oscillatory inductance-capacitance-resistance (LCR) circuit as shown in FIG. 4.

Figure 5:
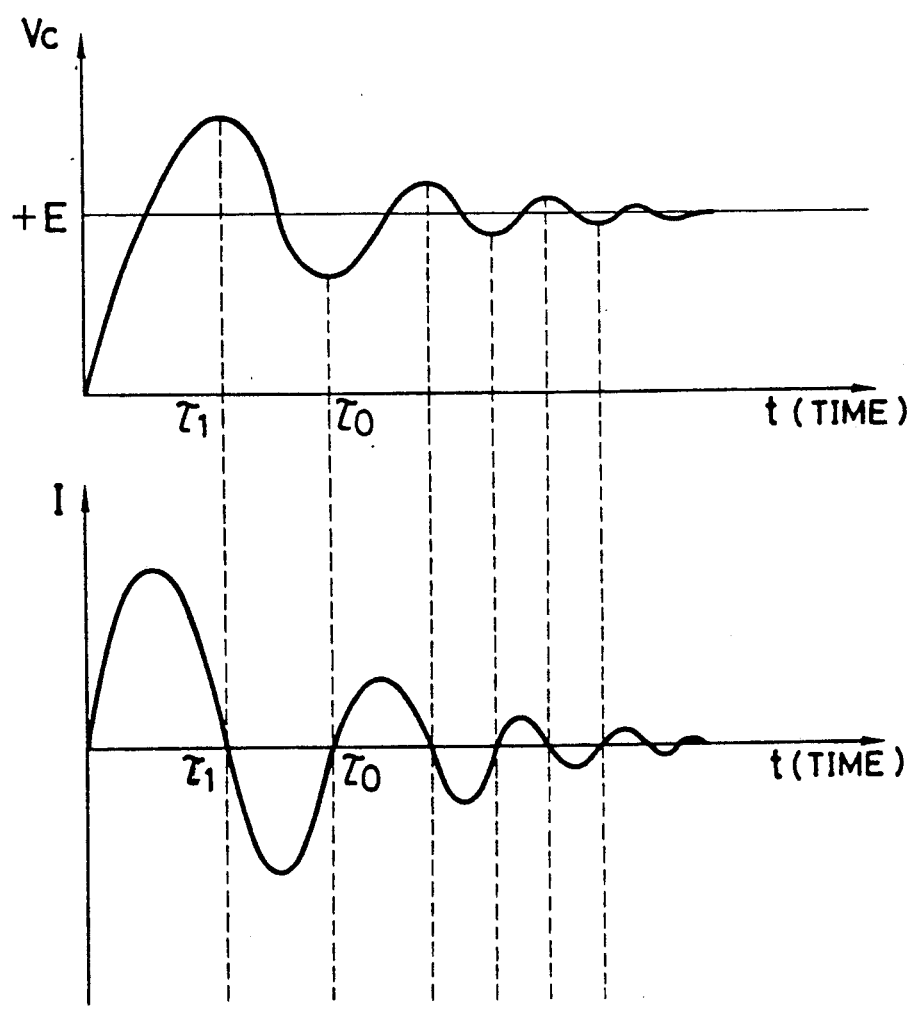
FIG. 5 is a diagram showing changes with time of voltage Vc and current I in the capacitor C in the LCR series circuit of FIG. 4.

After closing a switch S in the serial LCR circuit of FIG. 4, voltage Vc across a capacitor C and current I through the circuit change with time as shown in FIG. 5 as is well known as the dynamic transient phenomenon of an LCR circuit. In FIG. 5, $\tau_1$ and $\tau_0$ are time constants which are determined from the values of L, C and R.

The operating system of the invention is designed to carry out synchronous switching at a time constant $\tau_0$ with the capacitor C in FIG. 4 considered to be an EL element or a bipolar capacitor (to be described later) and the switch S considered to be one of the switching elements of the inverter. That is, the operating system of the invention utilizes the oscillatory or transient phenomenon of the LCR circuit. A stable steady state is established in the operating circuit by alternately switching the transient phenomenon occurring when the power supply is $+E$ as shown in FIG. 4 and the transient phenomenon occurring when the power supply is $-E$, though not shown, in synchronization with the time constant $\tau_0$.

It is to be noted that a oscillatory phenomenon as shown in FIG. 5 does not occur in the LCR circuit when the resistance R exceeds a certain value. If the operating circuit of the invention has a resistance equivalent component in excess of a certain value, no reverse flow of charge does occur.

A resistance equivalent component in the operating circuit corresponding to R of an LCR circuit includes a resistance in the circuit, a magnetic flux loss, DC resistance, and magnetic flux saturation of the coil, a dielectric loss and luminous exitance of the EL element, and the like. Smaller the R equivalent component, the more the reverse current flow or the larger the amount of charge is fed back. If the R equivalent component were zero, an ideal state would be achieved as described in conjunction with FIG. 2.

For the construction of a operating circuit, a choice of the coil is important and it should be carefully chosen so as to meet the above-mentioned requirements. Also switching elements should desirably have a reduced on-state resistance.

The operating circuit of the present invention switches the power supply voltage between $+E$ and $-E$. To this end, any conventional well-known methods may be employed, for example, the switching frequency f is adjusted so as to provide synchronization with $\tau_0$. This needs a careful adjustment because if the switching frequency f were wrongly adjusted for synchronization with $\tau_1$, then there would result a very unstable circuit which can cause a failure of the EL element.

According to the present invention, the charge accumulated in the EL element is recovered to the same power supply terminal under the impetus of the coil while minimizing a loss or diversion to the other power supply terminal, thereby improving power efficiency.

Figure 6:
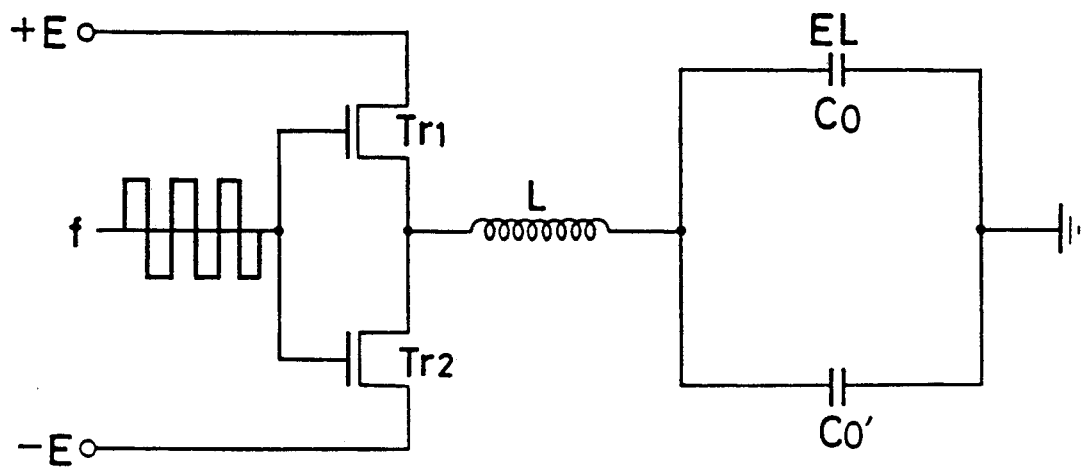

It is to be noted that if it is desired to have a lower inductance than the value of L determined from the equation: $f = \frac{1}{2}\pi\sqrt{LC}$ for the ideal state circuit, a bipolar capacitor Co' may be connected in parallel to the EL element as shown in FIG. 6. Then the inductance L of the coil may be set to a value calculated from the equation using C given as the sum of the capacitance Co' of this dummy capacitor and the capacitance Co of the EL element. In this case, however, the current value, especially the maximum current value $Imax = CE/\sqrt{LC}$ through the coil L is also increased as the inductance is reduced. The diameter of a wire used for winding the coil must be increased in proportion to a reduction of inductance.

Figure 7:
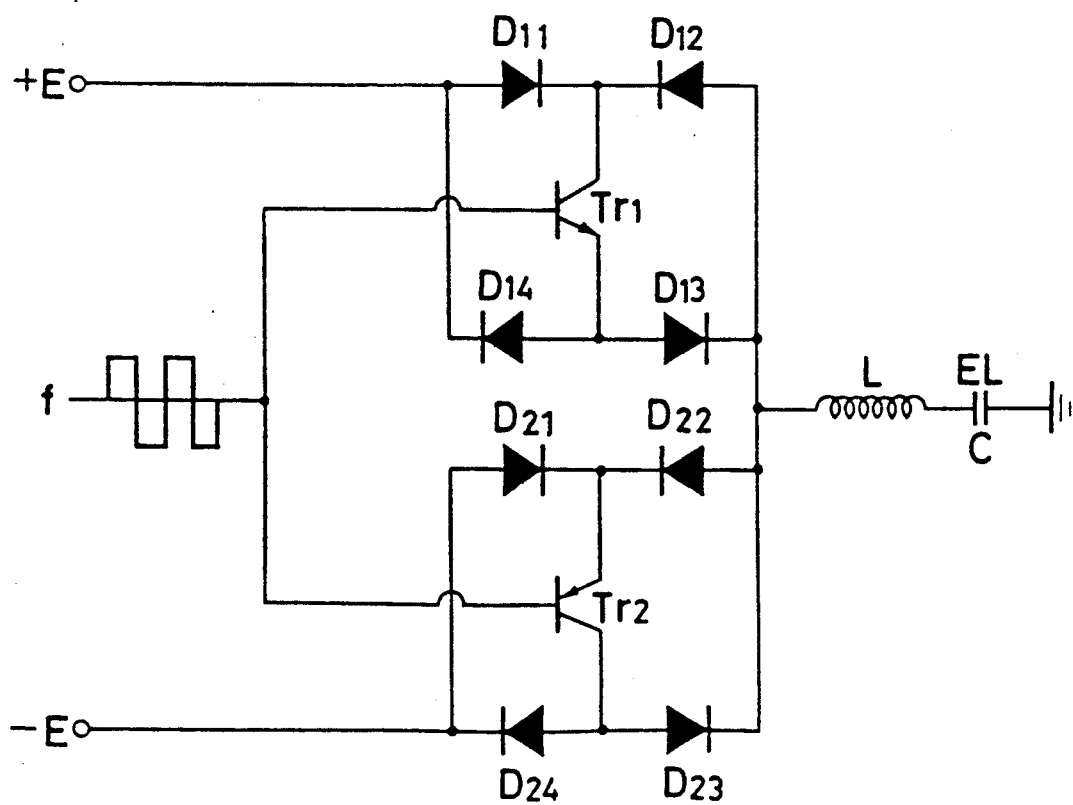

Most switching elements, typically power MOSFET's conduct current flow not only in the drain-to-source direction, but also substantially equally in the source-to-drain direction insofar as the channel is open. When switching elements having the diode characteristic of allowing only drain-to-source current flow, for example, power transistors are used, two groups of diodes D11, D12, D13, D14 and D21, D22, D23, D24 may be arranged as shown in FIG. 7. With this arrangement, both forward and reverse currents flow the switching elements only in a collector-to-emitter or emitter-to-collector direction.

The DC power supply used in the invention is not particularly limited. The use of a secondary battery or solar battery as the power supply is advantageous for power saving. However, direct recharging of the secondary battery with the reverse current flow reduces the battery lifetime and is sometimes difficult for some batteries.

Figure 8:
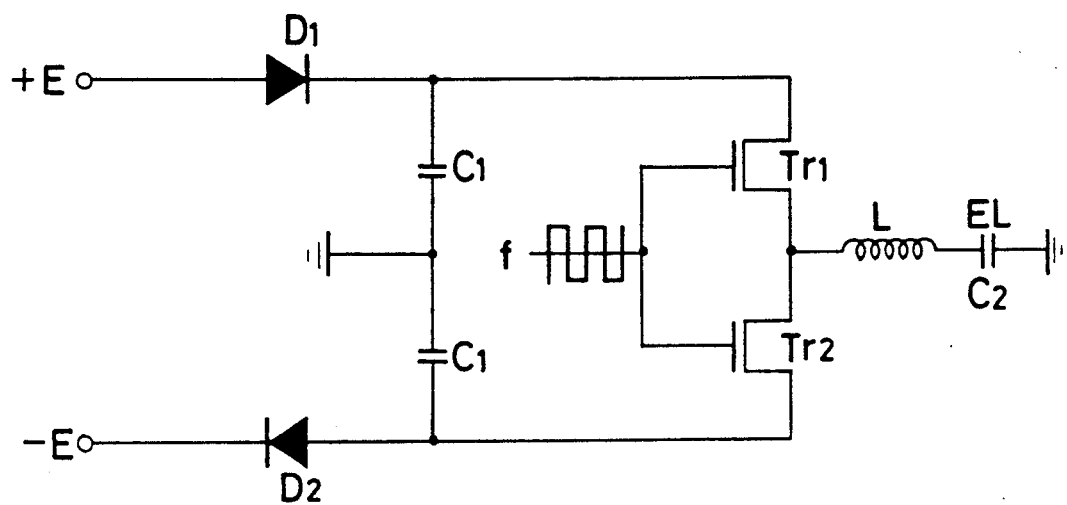

Therefore, when it is desired to use a battery as the power supply, diodes D1 and D2 are inserted between the power supply terminals $+E$ and $-E$ and the switching elements Tr1 and Tr2, respectively, and capacitors C1 and C1 are connected to the D1-Tr1 and the D2-Tr2 connections, respectively, as shown in FIG. 8.

Figure 9:
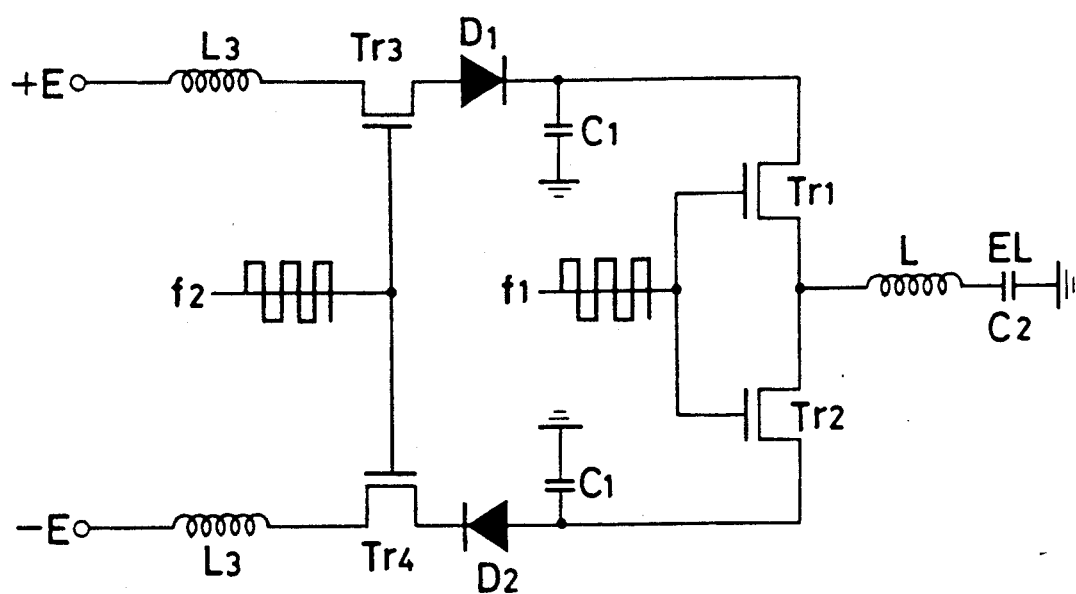

An alternative arrangement is shown in FIG. 9. In addition to diodes D1 and D2 and capacitors C1 and C1 connected as in the immediately preceding embodiment, a second inverter is added to the circuit which includes switching elements Tr3 and Tr4 adapted to switch at the same frequency f and close at the time of reverse current flow. It is also effective to further provide coils L3 and L3 between the second inverter and the power supply as phase control inductors because the coils prevent accumulation of charges from the power supply to the capacitors C1 during supply of charges to the EL element or reverse flow of charges from the EL element, considerably reducing the power loss.

Figure 10:
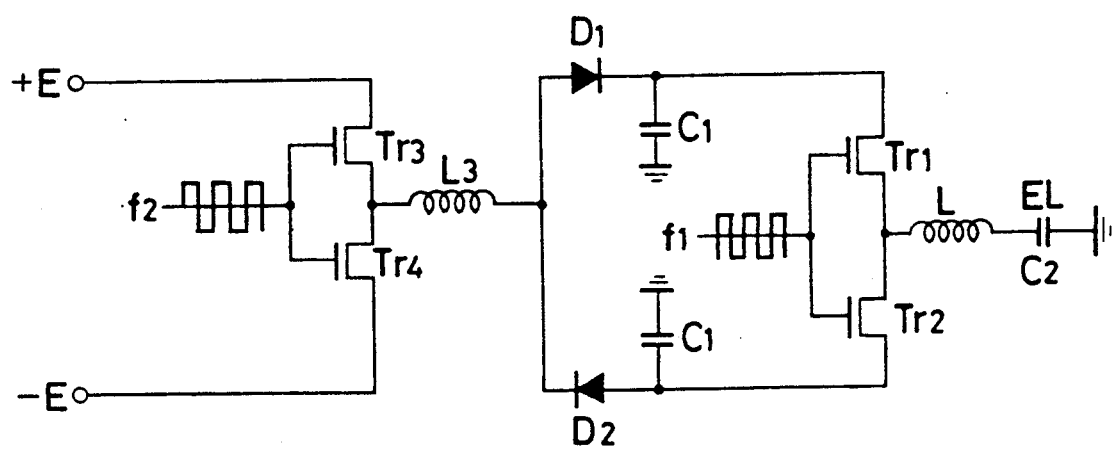

A still further arrangement is shown in FIG. 10 which uses a single coil. A coil L3 is connected at one end to the aft end of the second inverter consisting of switching elements Tr3 and Tr4 connected to the power supply terminals and at the other end to the connection between diodes D1 and D2.

In the embodiments of FIGS. 9 and 10, the switching frequencies for the first and second inverters are equal, that is, f1=f2. The arrangement is such that Tr3 is closed when Tr1 is opened and Tr3 is opened when Tr1 is closed. More particularly, the switching elements Tr1, Tr2, Tr3, and Tr4 open and close as follows.

| Switching element | $0-\tau_0$ | $\tau_0-2\tau_0$ |
|---|---|---|
| Tr1 | Open | Close |
| Tr2 | Close | Open |
| Tr3 | Close | Open |
| Tr4 | Open | Close |

The equation: $f = \frac{1}{2}\pi\sqrt{LC}$ for the ideal state circuit applies to these embodiments provided that C is given by $1/C = 1/C1 + 1/C2$ wherein C1 is the capacitance of the capacitor and C2 is the capacitance of the EL element. It is permissible to assume $C \approx C2$ in the event of $C1 > C2$.

Since the coil L3 is inserted for the purpose of avoiding the switching energy loss in switching elements Tr3 and Tr4, inductance L3 and capacitance C1 may also be selected to be approximate values enabling $f \geq \frac{1}{2}\pi\sqrt{L3C1}$. The energy loss is minimized to approximately zero by such a choice.

When it is desired to connect a plurality of EL elements to a direct current supply, the EL elements may be connected in parallel to the input or output end of the coil L.

In the operating circuit of the invention used to operate the EL element, the dynamism that charges accumulated in the EL element are fed back as reverse current flow depends on the capacitances of EL element and capacitors, the inductance of inductor, the frequency and waveform of switching signal. These three parameters must be properly selected before the EL element can be operated by the operating circuit of the invention. Selection of the parameters is not particularly limited and may be carried out by any desired method, but preferably by the following methods because of ease of operation.

(1) A first method uses a fixed switching frequency f ($\tau$) of the inverter and a variable pulse duration duty ratio (ratio of open duration $\tau_0$ of a switching element to half period $\tau$, $\tau_0/\tau$) to thereby determine the duty ratio.

(2) A second method uses a fixed duty ratio and a variable switching frequency f to thereby determine the switching frequency.

(3) A third method uses both a variable switching frequency f and a variable duty ratio to thereby determine both the values.

These methods are advantageous in that they can accommodate for any change of the luminance requirement and replacement to an EL element having a different capacitance without changing the inductor.

Figure 11:
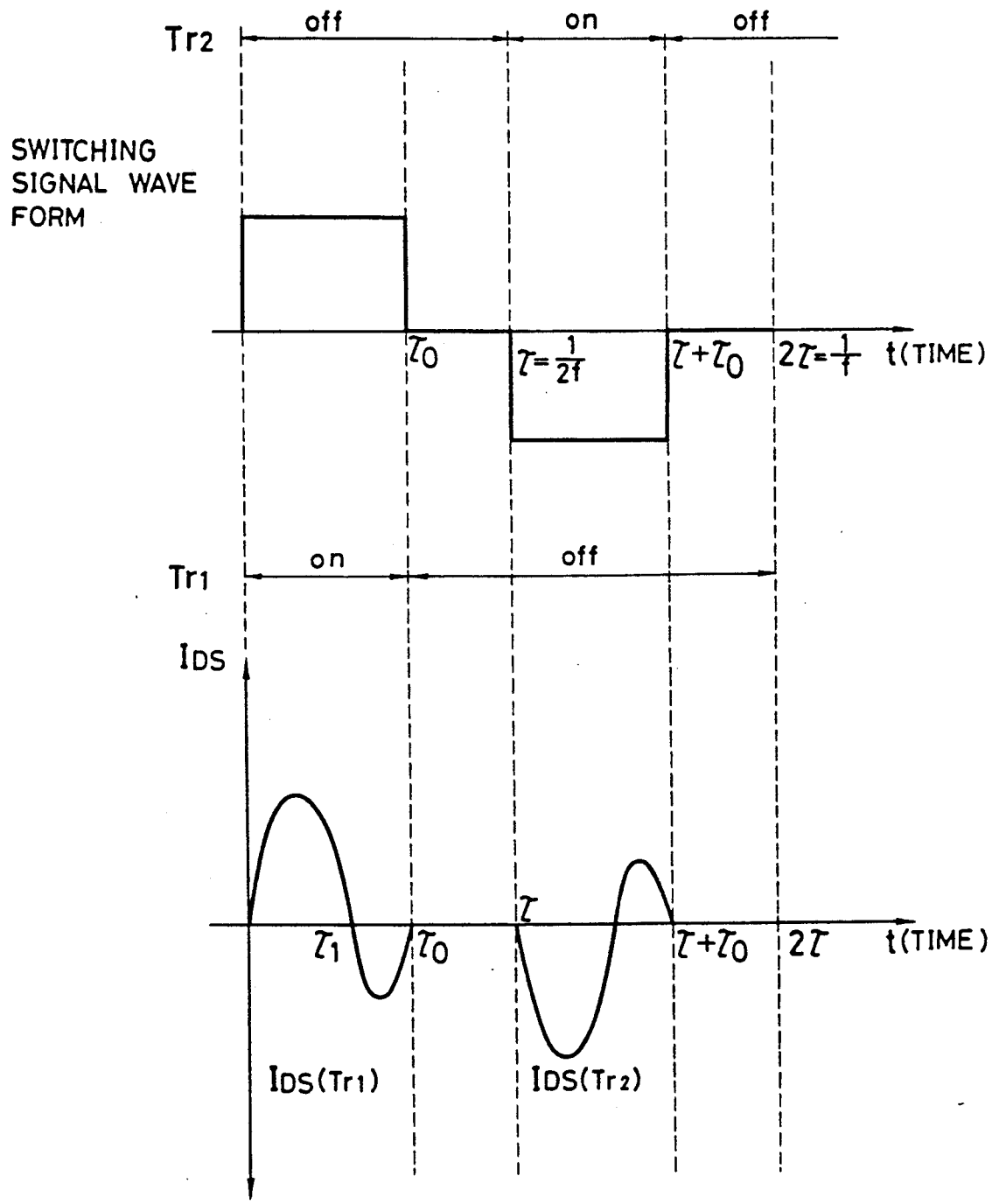
FIG. 11 is a diagram showing changes with time of switching signal waveform and drain-source current $I_{DS}$ with the pulse duration duty ratio set to be less than 1.

In particular, the first method of setting duty ratio is suitable for operating an EL element of a small area at a relatively low frequency without increasing the inductance of the coil. FIG. 11 shows the switching signal waveform and drain-to-source current $I_{DS}$ for a fixed frequency f and a duty ratio $\tau_0/\tau$ set to less than unity (1). This method allows one to adjust and determine the switching frequency and duty ratio while observing the current and voltage waveforms between the drain and the source of one of the switching elements of the inverter on a suitable display such as an oscilloscope.

More particularly, the switching frequency and duty ratio are adjusted and determined by manipulating an adjustment volume associated with the oscillatory circuit.

Next, a further preferred embodiment of the EL operating circuit of the invention is described wherein synchronized feedback of reverse current flow is automatically accomplished without resorting to manual operation such as volume adjustment.

Figure 12:
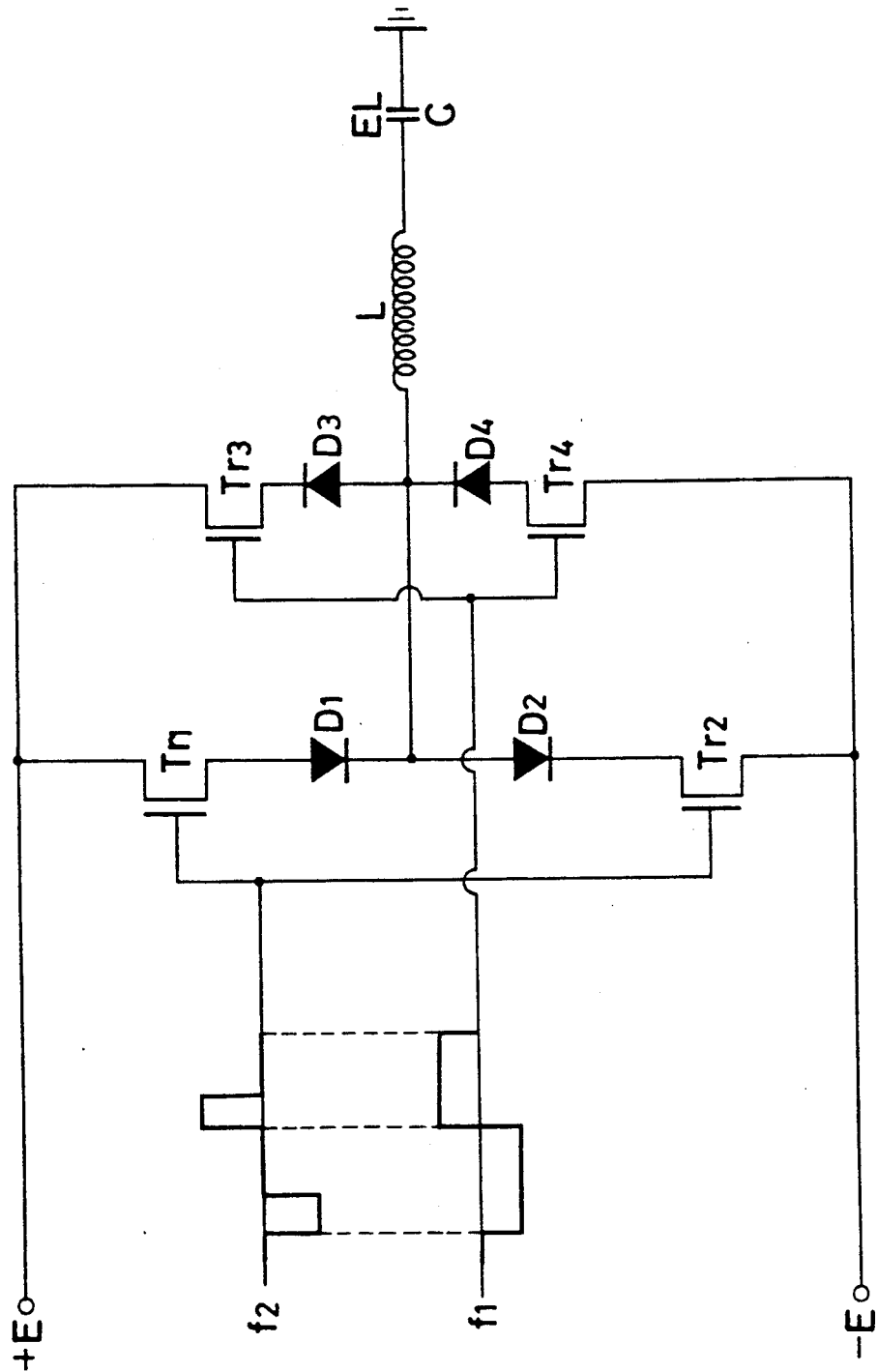

FIG. 12 shows a circuit for an automatic setting system wherein the current mode will automatically follow a setting of frequency f. The circuit includes a charge-up path for forward current flow from the power supply to the EL element and a feedback path for reverse current flow, separately provided between the power supply and the inductor. Both the paths have incorporated therein a charging inverter including switching elements Tr1 and Tr2 and a feedback inverter including switching elements Tr3 and Tr4, and diodes D1, D2, D3, and D4 for separating the paths. The charging and feedback inverters are turned on and off with signals having frequencies f2 and f1 matched with the EL operating frequency f.

This circuit functions such that a charge from the power supply positive terminal +E is accumulated in the EL element as a forward current flow through Tr1 and then fed back as a reverse current flow through Tr3. Similarly, a charge from the power supply negative terminal −E is accumulated in the EL element as a forward current flow through Tr2 and then fed back as a reverse current flow through Tr4. If frequencies f1 and f2 are forward synchronous pulses, a choice is made such that transistors Tr1 and Tr3 are of the same channel type, transistors Tr2 and Tr4 are of the same channel type, and Tr1 and Tr2 and Tr3 and Tr4 are pairs of complementary transistors of different channel types. If frequencies f1 and f2 are opposite synchronous pulses, a choice is made such that transistors Tr1 and Tr3 are of different channel types, transistors Tr2 and Tr4 are of different channel types, and Tr1 and Tr2 and Tr3 and Tr4 are pairs of complementary transistors of different channel types.

The signal wave for switching the transistors Tr3 and Tr4 of the feedback inverter is of rectangular waveform and has a frequency f1 equal to the EL operating frequency f. The signal wave of frequency f1 may have a pulse duration duty ratio of at least $\tau_0/\tau$ though it is generally selected to be a fixed value. In the illustrated embodiment, the duty ratio is equal to 1.

The signal wave for switching the transistors Tr1 and Tr2 of the charging inverter is of rectangular waveform and has a frequency f2 equal to the EL operating frequency f. The signal wave of frequency f2 may have a pulse duration $\tau_0$ having a duty ratio $\tau_2/\tau$ which may be either fixed or variable, though a certain restraint is imposed as will be described later. The duty ratio $\tau_2/\tau$ is generally up to $\tau_0/\tau$, preferably in the range of from $\tau_1/\tau$ to $\tau_0/\tau$. It will be understood that the frequency and duty ratio are arbitrary and may be suitably determined insofar as the above-mentioned requirements are met.

Figure 13:
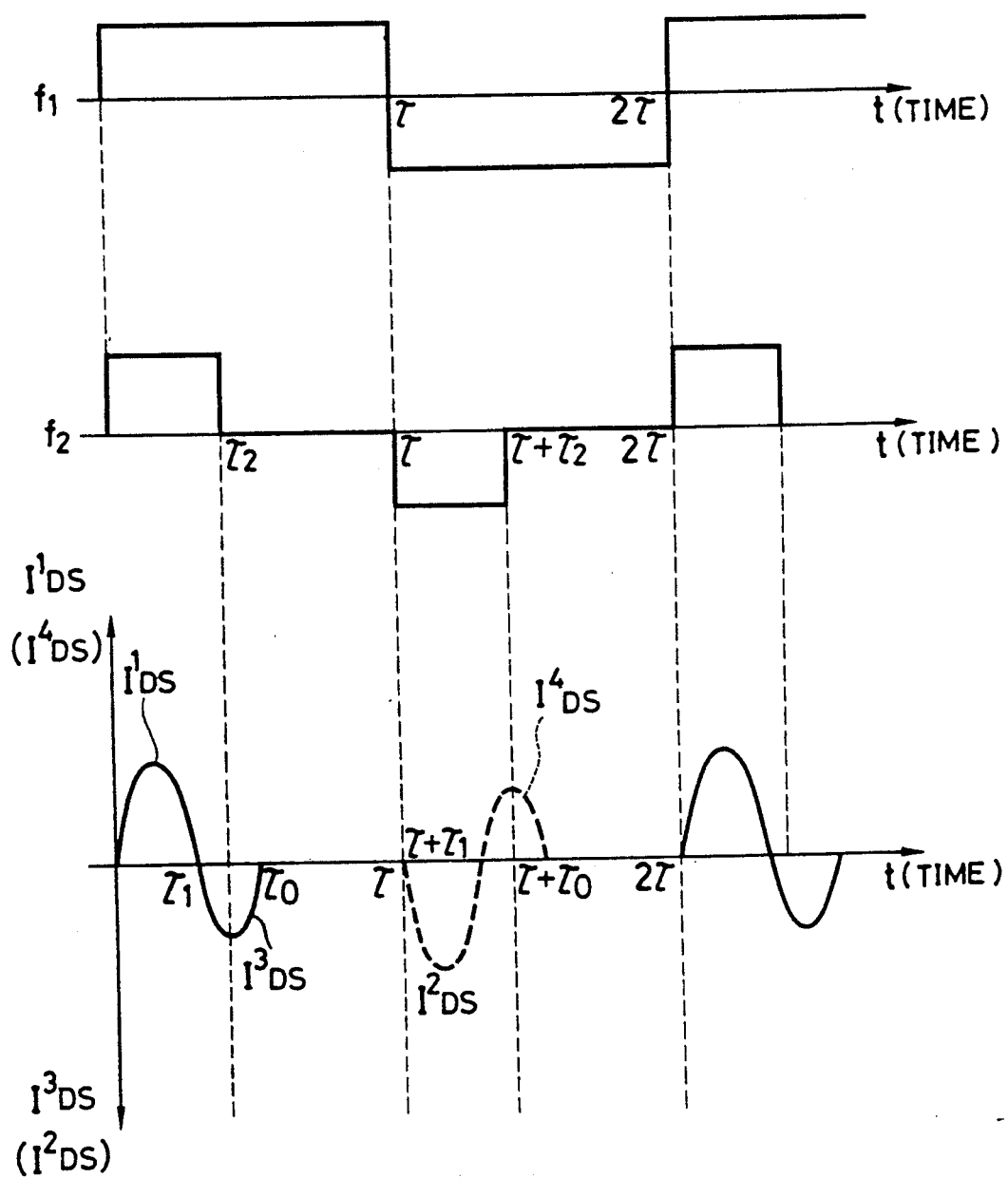
FIG. 13 is a diagram showing changes with time of waveforms of switching signal waves having frequencies f1 and f2 and drain-source currents $I^1{}_{DS}$, $I^2{}_{DS}$, $I^3{}_{DS}$, and $I^4{}_{DS}$, when a reverse feedback current flow mode automatic setting system according to the invention is used.

The process of charging and feedback of charges associated with the positive power supply terminal +E is now described by referring to the drain-source current flows $I^1{}_{DS}$ and $I^3{}_{DS}$ through transistors Tr1 and Tr3 and the signal waves of frequencies f1 and f2. FIG. 13 is a diagram showing the waveforms of drain-source current flows $I^1{}_{DS}$ and $I^3{}_{DS}$ through transistors Tr1 and Tr3 along with the signal waves having frequencies f1 and f2. In the current waveform section, curves in broken lines show the waveforms of drain-source current flows $I^2{}_{DS}$ and $I^4{}_{DS}$ through transistors Tr2 and Tr4 associated with the power supply negative terminal $-E$.

In the operating circuit of FIG. 12, time constants $\tau_1$ and $\tau_0$ are variables determined as a function of the capacitance, inductance, and resistance of the circuit. The value of pulse duration $\tau_2$ need not be identical to the value of $\tau_1$ or $\tau_0$ as seen from FIG. 13, though $\tau_2 \leq \tau_0$ is necessary as previously described. If $\tau_2 > \tau_0$, then the charge once fed back to the power supply terminal is undesirably accumulated again in the EL element through Tr1. Another preferred condition is $\tau_2 \geq \tau_1$ because a noticeable switching energy loss occurs under a condition: $\tau_2 < \tau_1$.

This operating circuit enables automatic feedback of reverse current flow even if the signal waves of frequencies f1 and f2 are once set and thereafter kept fixed insofar as the condition: $\tau_2 \leq \tau_0$ is met. This allows the reverse current feed back mode to be automatically followed even when the value of $\tau_0$ has changed due to a change with time of the capacitance of the EL element which is a drawback of the EL element.

Figure 14:
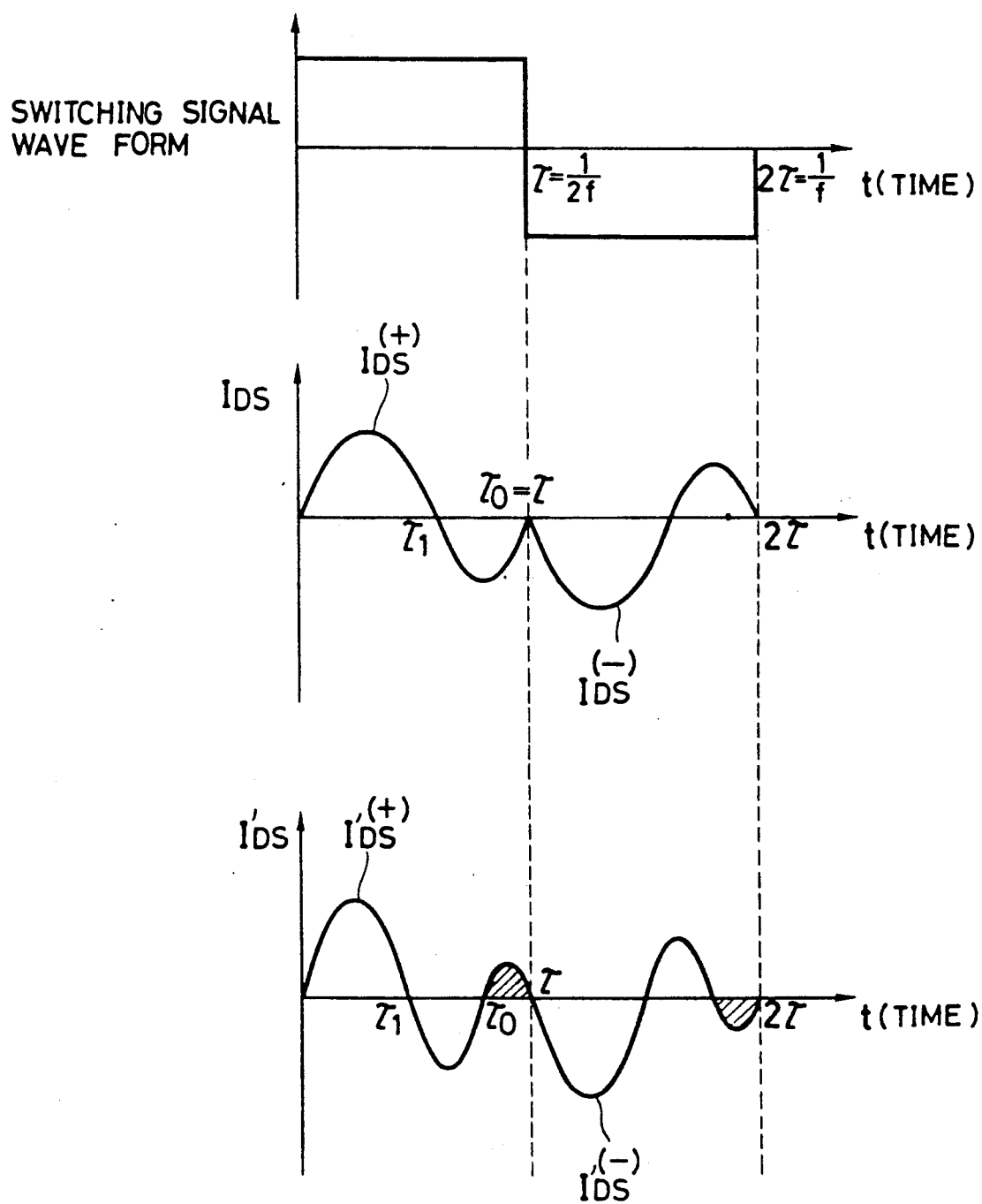
FIG. 14 is a diagram showing changes with time of drain-source currents $I^{(+)}{}_{DS}$ and $I^{(-)}{}_{DS}$ available at the time of initial setting and drain-source currents $I'^{(+)}{}_{DS}$ and $I'^{(-)}{}_{DS}$ after the EL element has changed its capacitance, when an automatic setting system is not used.

The EL element lowers its capacitance as it is operated for an extended period, say several years. Unless the automatic setting mode is used, the value of $\tau_0$ which was equal to the value of $\tau$ of switching frequency f at the time of initial setting as shown in a middle section of FIG. 14 decreases so that $\tau_0$ is out of timing with $\tau$ as shown in a lower section of FIG. 14. In FIG. 14, $I_{DS}$ is a drain-source current flow at the time of initial setting and $I'_{DS}$ is a drain-source current flow after a change with time of the EL element capacitance, and (+) and (−) designate that the associated current flows are on the positive and negative sides of the power supply, respectively. Then, a recharging current flow corresponding to a shaded area in the lower section of FIG. 14 generates, resulting in a reduced EL operating efficiency.

The automatic setting arrangement as illustrated in FIG. 12 essentially eliminates the switching loss and occurrence of a re-charging current flow due to a capacitance change with time of the EL element insofar as the condition: $\tau_1 \leq \tau_2 \leq \tau_0$ is met.

Figure 15:
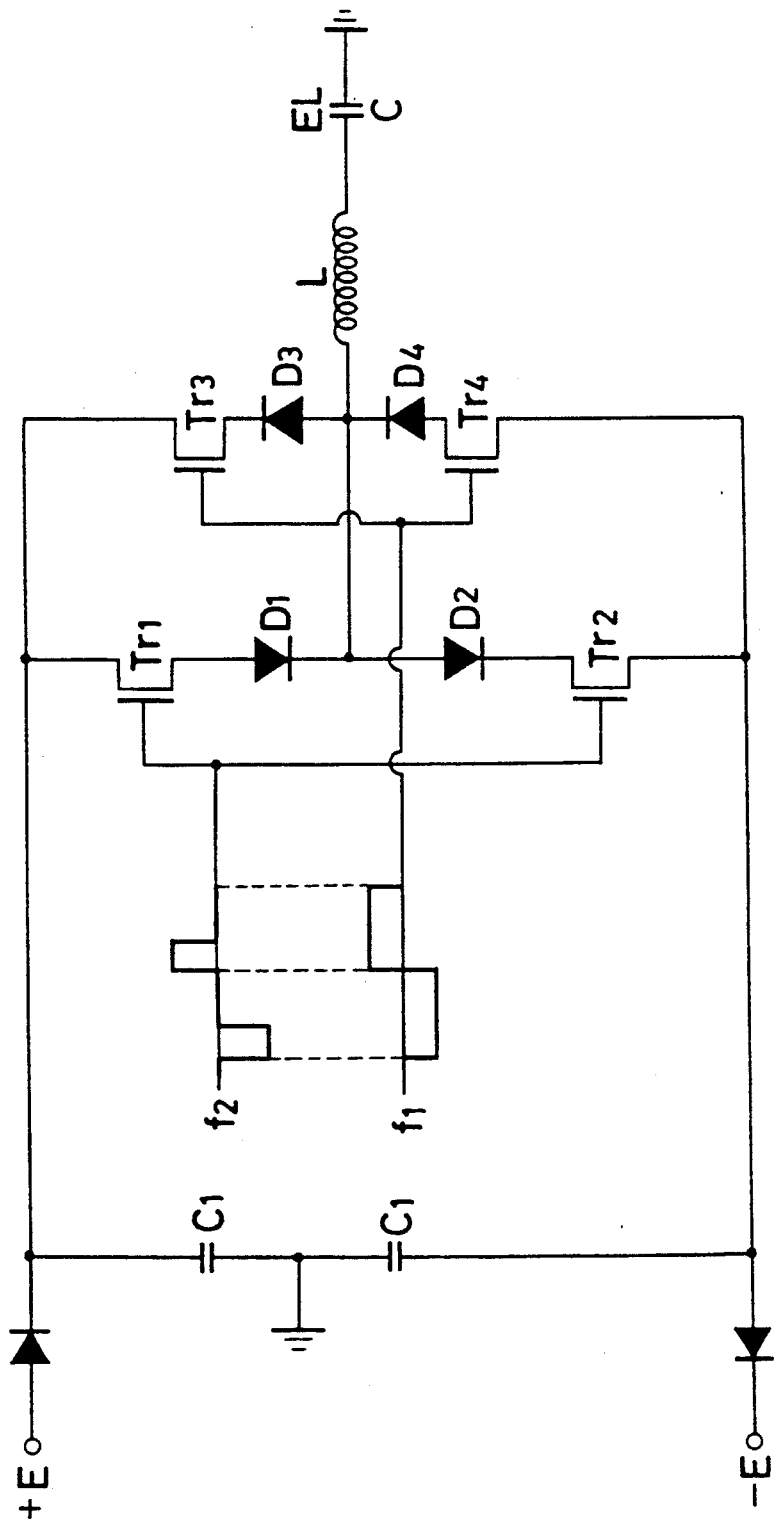

A modification of the circuit of FIG. 12 is shown in FIG. 15 wherein diodes are inserted between the power supply terminals and the switching elements Tr1 and Tr2 of the charging inverter, and capacitors C1, C1 are provided for buffering the reverse current flows for the same reason as previously described. The provision of a second inverter or a phase control inductor as shown in FIG. 9 or 10 can further reduce the power loss.

Another automatic setting method is described wherein the current flow mode is followed by providing reverse current flow bypass channels in the form of diodes in parallel with the switching elements of the inverter.

Figure 20:
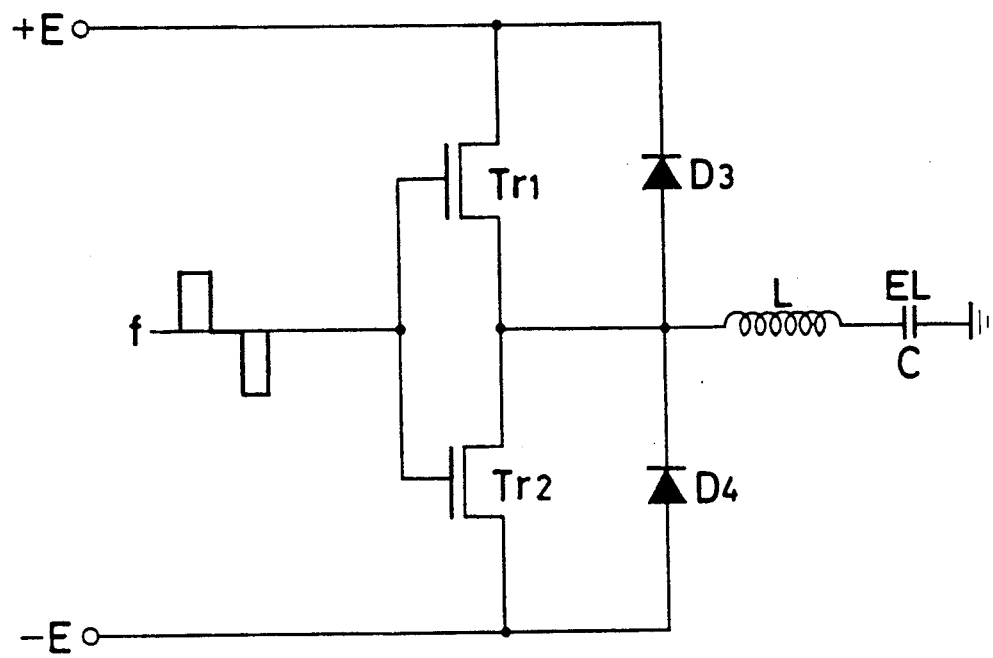
Figure 21:
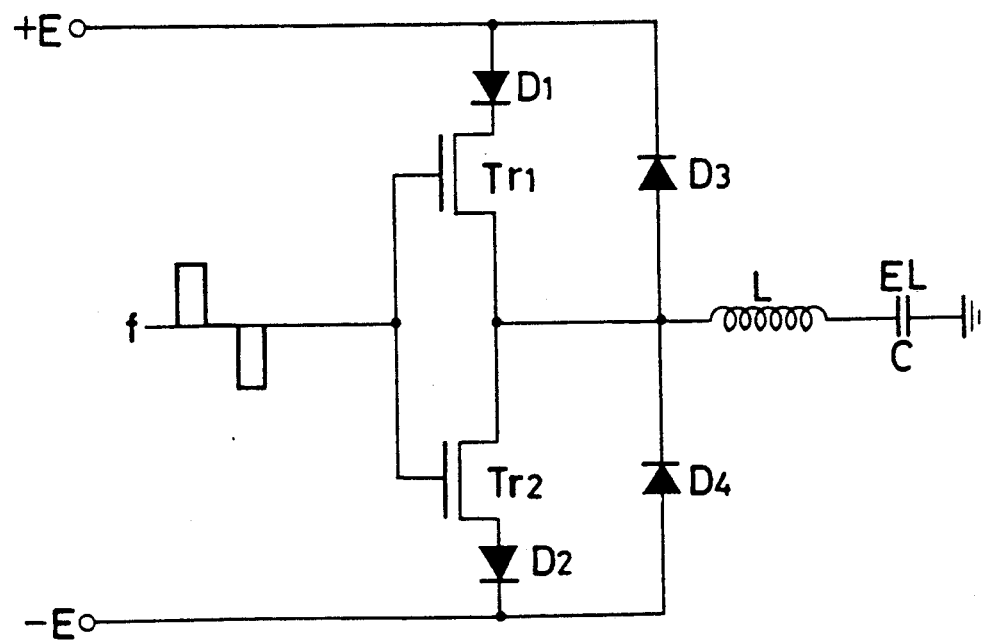

This method is enabled by the circuit arrangements shown in FIGS. 20 and 21 in which bypass channels for reverse current flows are formed by connecting diodes D3 and D4 in parallel with the switching elements Tr1 and Tr2 of the inverter, respectively, whereby the reverse current flow mode is automatically locked within a certain range of parameter settings.

The circuit of FIG. 20 becomes equivalent to that of FIG. 21 when switching elements Tr1 and Tr2 in FIG. 20 also have a diode function like transistors do. If FET's having parasitic diode characteristics are used as switching elements Tr1 and Tr2 in the circuit of FIG. 20, then an equivalent circuit to the circuit of FIG. 20 is accomplished without diodes D3 and D4 providing reverse current flow bypass channels. These arrangements correspond to the circuit arrangement of FIG. 12 with switching elements Tr3 and Tr4 omitted.

The operation of the circuit of FIG. 21 is now described for better understanding. During a time interval when first switching element Tr1 is opened and second switching element Tr2 is closed, positive charges are accumulated in the EL element through diode D1, switching element Tr1 and coil L, and reverse current flow is recovered to the positive terminal through diode D3. The switching element Tr1 should be closed at the point of time when the reverse current flow has been recovered to the positive terminal side. The second switching element Tr2 should be kept closed until the positive reverse current flow has been recovered to the positive terminal side.

Figure 22:
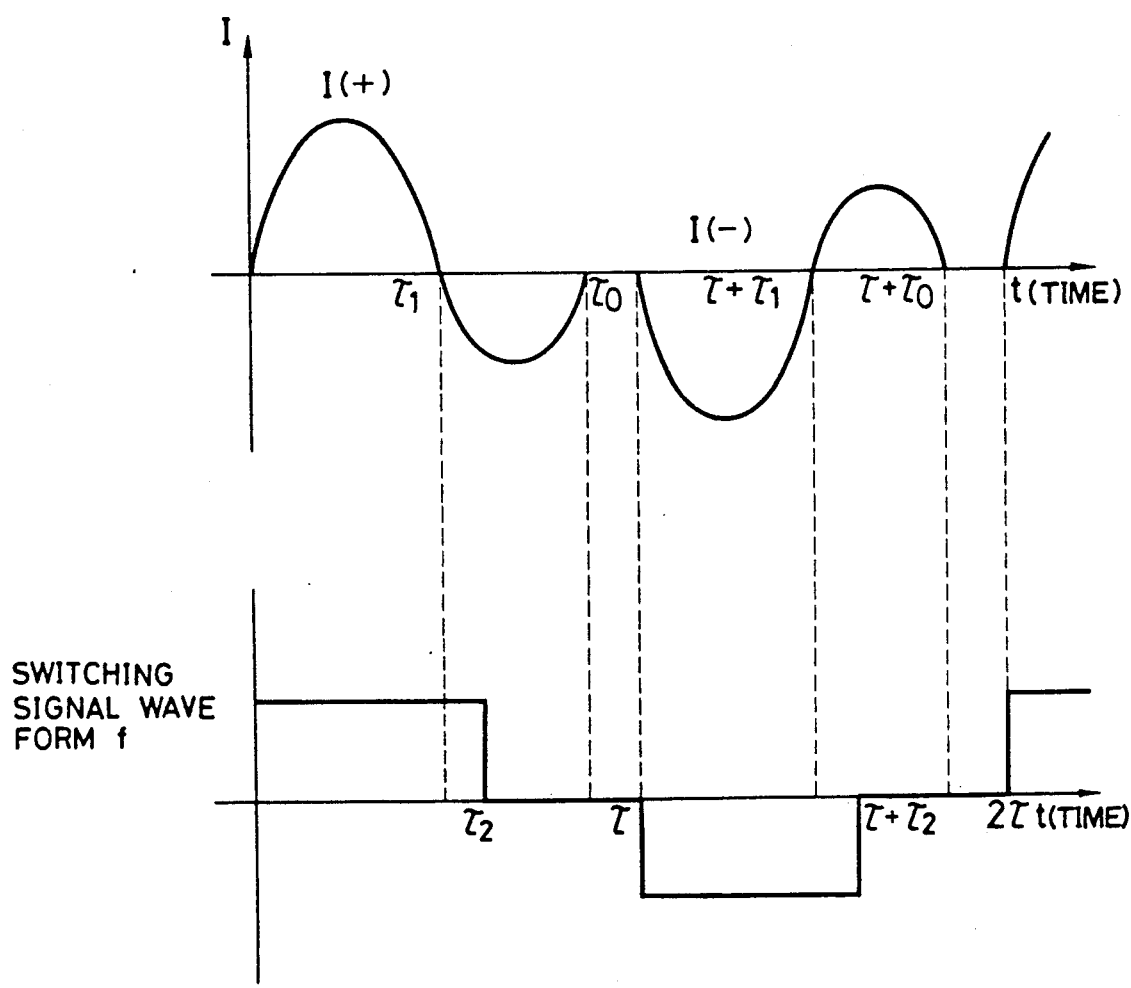
FIGS. 22 and 23 are diagrams showing changes with time of the waveform of switching signal having frequency f and current according to different automatic setting systems of the invention.

It is now assumed that FIG. 22 shows the waveform of current flow through an LCR circuit given by the L, C and R component of the circuit of FIG. 21 when second switching element Tr2 of FIG. 21 is opened and the waveform of the frequency f switching signal of the inverter. In this case, reverse current flow locking is automatically accomplished because of $\tau_1 \leq \tau_2 \leq \tau_0$ and $\tau_0 \leq \tau$. That is, the illustrated arrangement can successfully achieve automatic locking of reverse current flow within the range where the conditions:

$$\tau_1 \leq \tau_2 \leq \tau_0 \text{ and}$$

$$\tau_0 \leq \tau$$

are met.

It is to be noted that automatic locking of reverse current flow can be achieved under conditions: $\tau_1 > \tau_2$ and $\tau_0 \leq \tau$. However, these conditions would produce a switching loss because first switching element Tr1 is closed while the accumulating current is flowing and provide less efficient light emission because insufficient charge is delivered to the EL element.

Next, the range of an available EL element area is discussed for the circuit arrangement of FIG. 21 wherein the inductance L and switching waveform are fixed.

Figure 23:
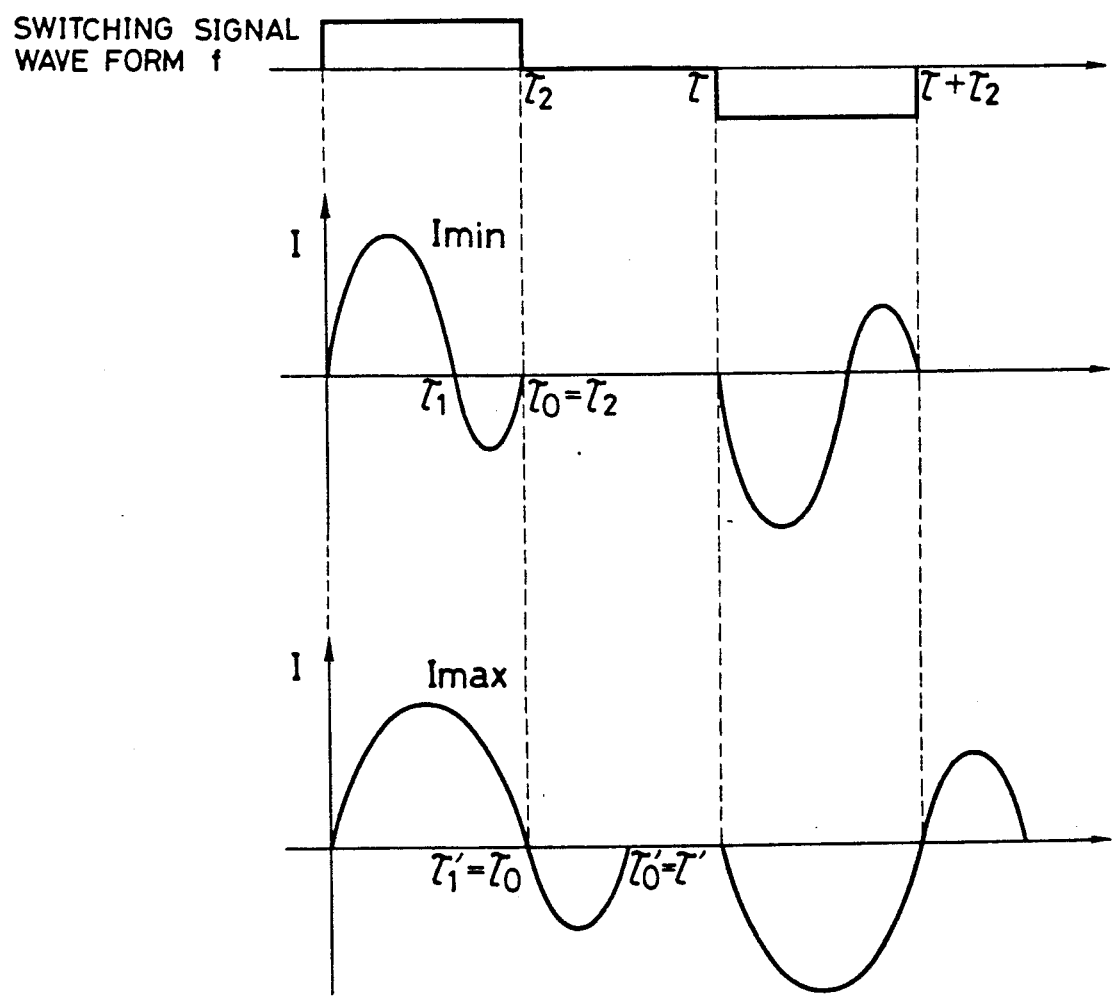

It is now assumed that in FIG. 23, for the fixed waveform of switching signal having frequency f and the fixed inductance L, Imin and Imax respectively designate the waveforms of current flow corresponding to the minimum and maximum areas of an EL element involved in the circuit arrangement wherein reverse current flow is automatically locked. Provided that the EL element has capacitances Cmin and Cmax corresponding to Imin and Imax, respectively, and $\tau_1:\tau_0 = \tau'_1:\tau'_0 \approx 2:1$ (this time constant ratio was empirically found to be approximately 2 : 1), then $$\tau_1:\tau'_1 = \tau_0:\tau'_0 = 2:3 = \sqrt{Cmin} : \sqrt{Cmax}.$$

Then, Cmin : Cmax = 4 : 9. Since the capacitance C of EL elements is proportional to their area for a group of elements of the same type, the range of an available EL area is given by the ratio of minimum area to maximum area which is equal to 4 : 9 = 1 : 2.25 for the fixed waveform of switching signal having frequency f and the fixed inductance L.

In the event that the open duration $\tau_2$ of the switching waveform is fixed and the frequency f is variable in a range of $\tau'_0 \leq \tau = \frac{1}{2}f$, that is $f \leq \frac{1}{2}\tau'_0$, the present system can adjust luminance by varying the frequency within the range of EL element minimum to maximum area ratio of 1 : 2.25 for the same fixed L value.

Though not shown, a still another system capable of automatic follow-up of frequency f is contemplated wherein the frequency f is automatically adjusted to be equal to $\frac{1}{2}\tau_0$ in accordance with a change of $\tau_0$, that is, switching elements are automatically opened or closed when the reverse current flow has been fed back. Alternatively, a system capable of automatic follow-up of pulse duration duty ratio is also contemplated wherein the frequency f is left variable, and the switching elements are automatically closed when the reverse current flow has been fed back. These circuits may be established by using those switching elements which are automatically turned off when current is available no longer, typically triacs, with a modification to the illustrated circuit embodiments. Alternatively, an oscillatory circuit may be modified such that the frequency or pulse duration duty ratio of the switching signal to the inverter will follow in synchronization when the reverse current flow has been fed back.

For the operation of an EL element according to the present invention, a power supply of the dual mode providing potentials of $\pm E$ volts is necessary and the other end of the EL element is connected to an intermediate or zero potential terminal, that is, grounded. In the event of a primary power supply of the single mode, it must be converted into a power supply of the dual mode allowing connection of an intermediate potential terminal before it can be used as the input power supply in the operating circuit of the invention. Any conventional well-known method may be used to convert a power supply of the single mode into a power supply of the dual mode. Some suitable methods are described below.

A first method is to use a DC-DC converter of the dual mode with an advantage that voltage can be stepped up and down at the same time.

Figure 16:
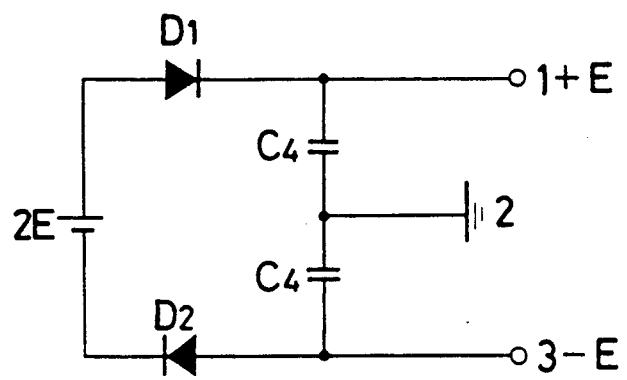
FIG. 16 is a diagram showing one exemplary circuit for converting a single mode power supply voltage into a double mode output voltage.

When a primary power supply has a potential of 2 E volt, the potential of 2 E volt may be divided into $\pm E$ volt and intermediate potentials using two capacitors C4, C4 having an equal capacitance. The arrangement is shown in FIG. 16 wherein a first capacitor C4 and a second capacitor C4 are connected across the primary power supply of 2E. A terminal 1 between the power supply positive terminal and first capacitor C4 produces an output of $+E$ volt and a terminal 3 between the power supply negative terminal and second capacitor C4 produces an output of $-E$ volt with respect to an intermediate terminal 2 at the connection between first and second capacitors C4 and C4. The terminals 1 and 3 are used as input terminals for the inverter while the intermediate terminal 2 is used as the ground terminal for the EL element.

When a primary power supply has a potential of e volt rather than 2 E volt, a DC-DC converter of the dual mode as previously described may be used. It is also possible to use a DC-DC converter of the single mode to convert the potential of e volt into a potential of 2 E volt, which can then be divided into $\pm E$ volt and intermediate potentials using a capacitor connection as shown in FIG. 16.

It is advantageous in the circuit arrangement of FIG. 16 that reverse current controlling diodes D1 and D2 are inserted between the primary power supply or the DC-DC converter and the potential dividing capacitors C4 because the capacitors C4 can then also serve to buffer reverse flow power.

It is to be noted that most commercially available DC-DC converters have a limited output voltage and only limited types of dual mode DC-DC converter are marketed. Therefore, the use of a DC-DC converter of the single mode in combination with potential division by capacitors is advantageous.

Next, a preferred embodiment of the EL operating power supply circuit according to the second aspect of the invention will be described.

The second aspect is the same in principle as the first aspect in that a reverse current flow is available. The second aspect is made by taking into account that the DC power supply potentials of $\pm E$ are stepped up to apply an AC load to the EL element. Necessary replacements are made to the embodiment of the first aspect. Stated in connection with the embodiment of the first aspect, the EL element is replaced by a bipolar capacitor, the inductor or coil is replaced by a transformer having primary and secondary windings, and the EL element is connected to the transformer whereby the EL element is operated with an AC power available at the transformer secondary winding.

Figure 17:
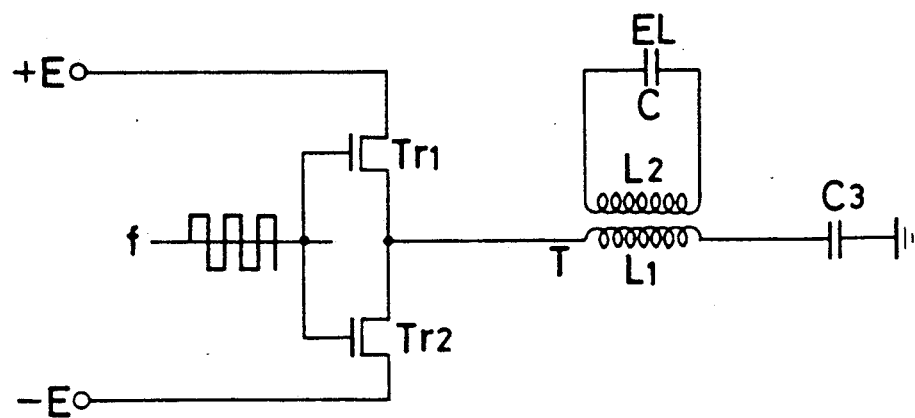
Figure 18:
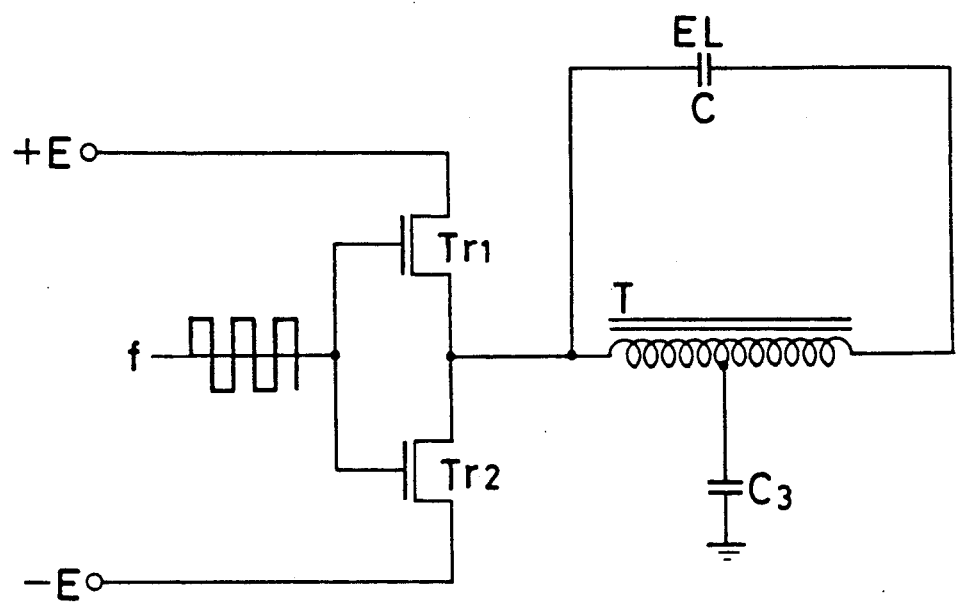
Figure 19:
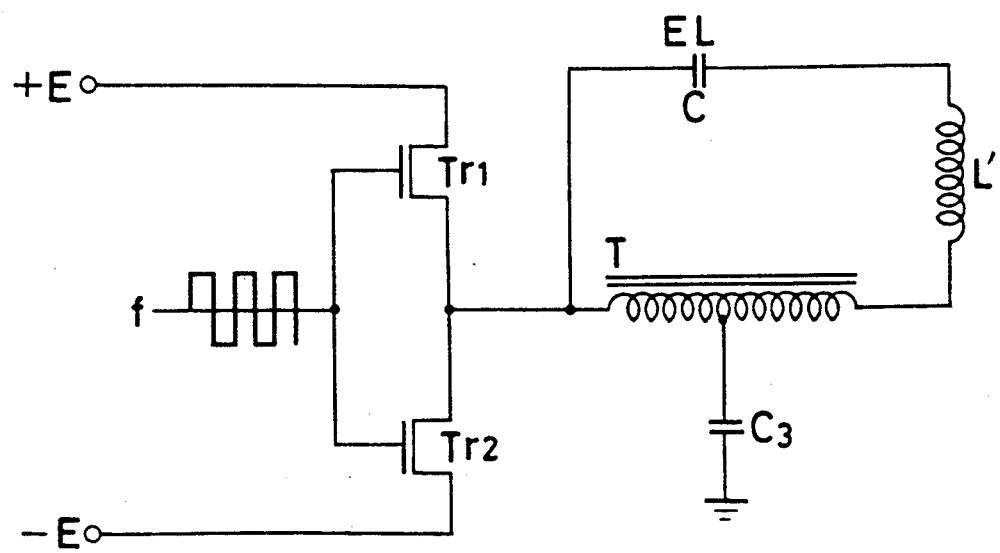

Two preferred embodiments are shown in FIGS. 17 and 18. In FIG. 17, power supply terminals having potentials of $+E$ and $-E$ are connected to an inverter consisting of switching elements Tr1 and Tr2 as in the first aspect. The output of the inverter is connected to a transformer T having primary and secondary windings having inductances L1 and L2. The secondary winding L2 is connected across an EL element having a capacitance C. The primary winding L1 is connected to a bipolar capacitor having a capacitance C3. FIG. 18 is a modification of FIG. 17. FIG. 19 is a further modification of FIG. 18 wherein a coil L' is added as a compensating inductor. As in the first embodiment, the order of connection of the transformer T and the bipolar capacitor C3 is not limited insofar as they are serially connected. Either the transformer T or the bipolar capacitor C3 may be on the side of the inverter.

These embodiments of the second aspect can be combined with all the embodiments of the first aspect with respect to the remaining portions though not illustrated in the drawings.

Although the embodiments have been described with reference to the switching elements of the enhancement mode (or normally off mode) for the inverter, similar operation can be achieved using switching elements of the depletion mode (or normally on mode). Commercially available examples of the depletion mode power MOSFET are "MTP 2N50" and "MTP 2P50" manufactured by Motorola. In general, N and P channel transistors are used on the positive and negative terminal sides, respectively. It should be understood that the foregoing embodiments are merely intended to be illustrative of the invention and therefore, any configuration providing an electrically equivalent circuit to the illustrated embodiments is considered as falling within the scope of the invention.

According to the present invention, since the inductor L or transformer T between the inverter and the EL element or bipolar capacitor C3 or behind the EL element or bipolar capacitor C3 causes phase and period shifts between loading current and voltage, no or little current flows across the circuit at the instant when the switching elements of the inverter are opened and closed, eliminating or minimizing the switching energy loss by the switching elements such as power transistors and power MOSFET.

A substantial portion of the charge accumulated in the EL element is recovered as reverse current flow to the power supply terminal from which the charge is delivered, by virtue of the inductor or transformer, minimizing any loss to the other terminal and thus resulting in significantly increased power efficiency.

As a result, the EL element can generate an increased amount of light at an increased luminance. The amount of heat that the switching elements such as power transistors and power MOSFET generate is significantly reduced with an increased degree of safety, eliminating the need for heat dissipating means.

A serious neck in prior art techniques for operating EL panels resided in an operating inverter. The prior art required fabrication of individual inverters specially designed for the area and luminance of different EL panels. Because the inverter generates heat upon switching, the inverter for operating an EL panel having an increased surface area needs a thermal countermeasure which is difficult. Attachment of a heat sink to the inverter increases the overall size and is less safe. For an EL panel which can be practically operated by a relatively small inverter without a heat sink, for example, an inverter with dimensions of 3 cm × 4 cm × 8 cm, an upper limit of about 400 to 600 cm² is imposed to its surface area with the luminance fixed.

The EL operating power supply circuit or inverter of the invention, for example, having dimensions of 3 cm × 4 cm × 8 cm, can operate a blue-green color EL panel having an area of about 4,000 cm² to 1 m² to emit light by regulating the pulse duration duty ratio while the lighting luminance can be arbitrarily set in the range of from 5 cd/m² to 50 cd/m² by changing the frequency of the inverter.

The EL operating power supply circuit or inverter of the invention is highly safe because of little heat generation upon switching, is compact in size, and can operate an EL panel having an increased surface area. Lighting luminance can be arbitrarily chosen. The invention enables efficient mass production of an EL operating system.

Various experiments were made in order to demonstrate how the circuit of the invention performs and to prove its effectiveness. Some of the experiments are given below.

EXPERIMENT 1

Four blue-green color EL panels each having a luminescent surface area of 572 cm² (corresponding to a capacitance C of 200 nF) were connected in parallel and driven in a push-pull manner using an inverter consisting of power MOSFET's which received a potential E=140 volts. Table 1 shows the luminous intensity of each EL panel and the temperature of a heat sink associated with each power MOSFET having an area of 150 cm² which is indicative of the amount of heat each power MOSFET generated.

Table 1 also shows the results obtained when an inductance L of 50 mH was connected between the inverter and the parallel connected EL panels according to the present invention.

TABLE 1

|  | Luminous intensity (surface illuminance) | Temperature of heat sink |
|---|---|---|
| Comparison | 130 lx | 115° C. |
| Invention | 500 lx | 42° C. |

EXPERIMENT 2

Four blue-green color dispersion EL panels each having a luminescent surface area of 572 cm² (corresponding to a capacitance C of 200 nF) were connected in parallel and operated at a frequency of 400 Hz and an effective voltage E=60, 80, 100, 120, and 140 volts. The electric power consumption per unit EL area (1 cm²) was compared between EL operation by a prior art method in which a voltage having a sine wave effective value E and a frequency of 400 Hz was directly applied to the parallel connected EL panels (Table 2) and EL operation according to the present invention at a frequency f of 400 Hz and an inductance L of 50 mH (Table 3).

TABLE 2

| | Prior Art | | | | |
|---|---|---|---|---|---|
| E: effective voltage, V | 60 | 80 | 100 | 120 | 140 |
| Luminance, Cd/m² | 12.6 | 24.6 | 38.2 | 52.3 | 66.8 |
| Surface illuminance, lx | 28 | 78 | 120 | 161 | 214 |
| Power consumption, mVA/cm² | 3.30 | 6.48 | 11.40 | 18.24 | 27.58 |

TABLE 3

| | Invention | | | | |
|---|---|---|---|---|---|
| E: effective voltage, V | 60 | 80 | 100 | 120 | 140 |
| Luminance, Cd/m² | 24.8 | 43.0 | 68.4 | 117.8 | 159.2 |
| Surface illuminance, lx | 78 | 135 | 215 | 370 | 500 |
| Power consumption, mVA/cm² | 2.814 | 5.032 | 6.88 | 9.108 | 12.125 |

As is evident from the actual measurements of Tables 2 and 3, the present invention provides significant improvements in luminance and power consumption as compared with the prior art system.

Surprisingly, the present invention accomplishes provides significant improvements in both luminance and power consumption over the entire range of varying voltage though the same frequency and effective voltage are used. That is, luminance is increased and power consumption is reduced. The benefit that a luminance increase and a power saving are achieved at the same time will be better understood from a quantitative aspect by comparing the power consumption required for providing the same luminance.

It is seen in Tables 2 and 3 that some points accidentally give the same surface illuminance. One pair is an illuminance of 78 lux at 80 volts in Table 2 and an illuminance of 78 lux at 60 volts in Table 3, and another pair is an illuminance of 214 lux at 140 volts in Table 2 and an illuminance of 215 lux at 100 volts in Table 3. For the illuminance of 78 lux, the prior art needs a power consumption of 6.48 m/mVA (Table 2) and the invention needs a power consumption of 2.814 m/mVA (Table 3) which is about 1/2.3, that is, 43% of the power consumption of the prior art. For the illuminance of 214 lux, the prior art needs a power consumption of 27.58 m/mVA (Table 2) and the invention needs a power consumption of 6.88 m/mVA (Table 3) which is about ¼ of the power consumption of the prior art.

Although some preferred embodiments have been described, many modifications and variations may be made thereto in the light of the above teachings. It is therefore to be understood that within the scope of the appended claims, the invention may be practiced otherwise than as specifically described.

We claim:

1. An EL operating power supply circuit comprising a DC power supply,
   a first inverter connected across the power supply for producing an AC voltage at an output thereof,
   an electroluminescent (EL) means, and
   an inductor, said electroluminescent means and said inductor being serially connected to said first inverter wherein the AC voltage is applied from the inverter to the electroluminescent means to emit light;
   wherein the inverter has a switching frequency f given by the following equation:

$$f = \frac{1}{4\pi \sqrt{LC}}$$

wherein L is an inductance of the inductor, C is a capacitance of the EL means, and the resistance component and resistance equivalent component of the circuit are negligibly small.

2. The EL operating circuit of claim 1 wherein said electroluminescent means comprises an electroluminescent element or an array of electroluminescent elements.

3. The EL operating circuit of claim 1 which further comprises a bipolar capacitor connected parallel to the electroluminescent means.

4. The EL operating circuit of claim 1 wherein the inductance of said inductor reduces the current during switching operation of said first inverter and a charge accumulated in the electroluminescent means through said first inverter and said inductor is recovered to the power supply side as a reverse current flow.

5. The EL operating circuit of claim 3 wherein the inductance of said inductor reduces the current during switching operation of said first inverter and a charge accumulated in the electroluminescent means and/or the bipolar capacitor through said first inverter is recovered to the power supply side as a reverse current flow.

6. The EL operating circuit of claim 1 which further comprises a buffering capacitor between said DC power supply and said first inverter.

7. The EL operating circuit of claim 1 which further comprises a second inverter between said DC power supply and said first inverter, said second inverter performing opposite switching operation to said first inverter.

8. The EL operating circuit of claim 7 which further comprises a phase controlling coil between said DC power supply and said second inverter and/or between said first inverter and said second inverter.

9. The EL operating circuit of any one of claims 1 to 8 wherein the first inverter is adapted to receive a switching signal wherein the frequency and/or pulse duration duty ratio of the switching signal can be set in a variable manner.

10. The EL operating circuit of any one of claims 1 to 8 wherein the first inverter includes a charging inverter section and a feedback inverter section, said charging and said feedback inverter sections being driven by a switching signal having the same frequency and the same rise, said feedback inverter section having a larger pulse duration duty ratio than said charging inverter section.

11. The EL operating circuit of any one of claims 1 to 8 wherein said first inverter includes at least a pair of switching elements and said power supply circuit further includes first diodes respectively connected in parallel with the switching elements for forming bypass channels for feeding back the reverse current flows.

12. The EL operating circuit of claim 11 which further includes second diodes respectively in forward series connection with the switching elements inside the inverter channels bypassed by said reverse current flow bypass channels.

13. An EL operating power supply circuit comprising:
   a DC power supply,
   a first inverter connected across the power supply for changing the DC power into an AC power at an output thereof, and
   a transformer having primary and secondary windings,
   a bipolar capacitor, said transformer and said bipolar capacitor being serially connected to the first inverter, and
   electroluminescent (EL) means connected to the transformer such that an AC output power available on the transformer secondary winding is applied to the electroluminescent means to emit light;
   wherein the inverter has a switching frequency f given by the following equation:

$$f = \frac{1}{4\pi \sqrt{LC}}$$

wherein L is an inductance of the inductor, C is a capacitance of the EL means, and the resistance component and resistance equivalent component of the circuit are negligibly small.

14. The EL operating circuit of claim 13 wherein said electroluminescent means comprises an electroluminescent element or an array of electroluminescent elements.

15. The EL supply circuit of claim 13 wherein the inductance of said transformer reduces the current during switching operation of said first inverter and a charge accumulated in the electroluminescent means through said first inverter is recovered to the power supply side as a reverse current flow.

16. The EL operating circuit of claim 13 wherein the inductance of said transformer reduces the current during switching operation of said first inverter and a charge accumulated in the electroluminescent means and/or the bipolar capacitor through said first inverter and said transformer is recovered to the power supply side as a reverse current flow.

17. The EL operating circuit of claim 13 which further comprises a buffering capacitor between said DC power supply and said first inverter.

18. The EL operating circuit of claim 13 which further comprises a second inverter between said DC power supply and said first inverter, said second inverter performing opposite switching operation to said first inverter.

19. The EL operating circuit of claim 18 which further comprises a phase controlling coil between said DC power supply and said second inverter and/or between said first inverter and said second inverter.

20. The EL operating circuit of any one of claims 13, 14, 15-19 wherein the first inverter is adapted to receive a switching signal wherein the frequency and/or pulse duration duty ratio of the switching signal can be set in a variable manner.

21. The EL operating circuit of any one of claims 13, 14, 15-19 wherein the first inverter includes a charging inverter section and a feedback inverter section, said charging and said feedback inverter sections being driven by a switching signal having the same frequency and the same rise, said feedback inverter section having a larger pulse duration duty ratio than said charging inverter section.

22. The EL operating circuit of any one of claims 13, 14, 15-20 wherein said inverter includes at least a pair of switching elements and said first power supply circuit further includes first diodes respectively connected in parallel with the switching elements for forming bypass channels for feeding back the reverse current flows.

23. The EL operating circuit of claim 22 which further includes second diodes respectively in forward series connection with the switching elements inside the inverter channels bypassed by said reverse current flow bypass channels.

* * * * *